US012073969B2

(12) United States Patent
Cha et al.

(10) Patent No.: US 12,073,969 B2
(45) Date of Patent: Aug. 27, 2024

(54) COIL COMPONENT

(71) Applicant: SAMSUNG ELECTRO-MECHANICS CO., LTD., Suwon-si (KR)

(72) Inventors: Yoon Mi Cha, Suwon-si (KR); Ju Hwan Yang, Suwon-si (KR); Byung Soo Kang, Suwon-si (KR); Yong Hui Li, Suwon-si (KR); Boum Seock Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 733 days.

(21) Appl. No.: 17/168,067

(22) Filed: Feb. 4, 2021

(65) Prior Publication Data

US 2022/0102042 A1 Mar. 31, 2022

(30) Foreign Application Priority Data

Sep. 25, 2020 (KR) ........................ 10-2020-0124808

(51) Int. Cl.

| | |
|---|---|
| ***H01F 17/00*** | (2006.01) |
| ***H01F 27/02*** | (2006.01) |
| ***H01F 27/28*** | (2006.01) |
| ***H01F 27/29*** | (2006.01) |
| ***H01F 27/32*** | (2006.01) |

(52) U.S. Cl.

CPC ....... *H01F 17/0013* (2013.01); *H01F 27/022* (2013.01); *H01F 27/292* (2013.01); *H01F 27/32* (2013.01); *H01F 2027/2809* (2013.01)

(58) Field of Classification Search

CPC .. H01F 17/0013; H01F 27/022; H01F 27/292; H01F 27/32; H01F 2027/2809

See application file for complete search history.

(56) References Cited

U.S. PATENT DOCUMENTS 5,750,264 A * 5/1998 Ueno ..................... H01C 1/142 428/688
2003/0099085 A1* 5/2003 Duva ....................... H01G 2/12 361/311
2004/0240146 A1* 12/2004 Kayatani ................ H01G 2/103 361/306.3
2012/0274432 A1* 11/2012 Jeong .................. H01F 27/2804 336/192
(Continued)

FOREIGN PATENT DOCUMENTS

KR 10-2073727 B1 2/2020
KR 10-2109634 B1 5/2020

*Primary Examiner* — Malcolm Barnes
(74) *Attorney, Agent, or Firm* — MORGAN, LEWIS & BOCKIUS LLP

(57) ABSTRACT

A coil component includes: a body having first and second surfaces opposed in a length direction, third and fourth surfaces opposed in a width direction, and fifth and sixth surfaces opposed in a thickness direction; a coil portion disposed inside the body; a first insulating layer covering a portion of each of the fifth surface of the body and the sixth surface of the body; a second insulating layer covering a portion of the third surface of the body and the fourth surface of the body; a first external electrode disposed on the first surface of the body; and a second external electrode disposed on the second surface of the body.

21 Claims, 8 Drawing Sheets

(56) References Cited

U.S. PATENT DOCUMENTS

| | | | | |
|---|---|---|---|---|
| 2013/0050897 | A1* | 2/2013 | Kim | H01G 4/005 361/321.2 |
| 2015/0041193 | A1* | 2/2015 | Lee | H01G 4/12 174/258 |
| 2015/0325369 | A1* | 11/2015 | Inoue | H01G 2/12 336/200 |
| 2015/0380151 | A1* | 12/2015 | Choi | H01F 41/041 336/200 |
| 2016/0141093 | A1* | 5/2016 | Jeong | H01F 17/04 336/200 |
| 2016/0217920 | A1* | 7/2016 | Choi | H01F 41/046 |
| 2016/0268038 | A1* | 9/2016 | Choi | H01F 27/255 |
| 2017/0323725 | A1* | 11/2017 | Iso | H01F 27/292 |
| 2018/0337001 | A1* | 11/2018 | Tozawa | H01F 17/0013 |
| 2019/0122810 | A1* | 4/2019 | Oh | H01F 17/0013 |
| 2019/0189338 | A1* | 6/2019 | Kim | H01F 27/29 |
| 2019/0259526 | A1* | 8/2019 | Cho | H01F 27/29 |
| 2019/0279813 | A1* | 9/2019 | Jang | H01F 27/363 |
| 2020/0365315 | A1* | 11/2020 | Kim | H01F 17/04 |
| 2021/0043340 | A1* | 2/2021 | Hoshino | H01C 7/041 |
| 2021/0043366 | A1* | 2/2021 | Ooi | H01F 17/045 |
| 2022/0392690 | A1* | 12/2022 | Kim | H01F 17/04 |

* cited by examiner

COIL COMPONENT

CROSS-REFERENCE TO RELATED APPLICATION(S)

This application claims benefit of priority to Korean Patent Application No. 10-2020-0124808 filed on Sep. 25, 2020 in the Korean Intellectual Property Office, the disclosure of which is incorporated herein by reference in its entirety.

BACKGROUND

The present disclosure relates to a coil component.

An inductor, a coil component, is a typical passive component used in electronic devices. Meanwhile, as electronic devices become increasingly higher performance and are miniaturized, miniaturization of coil components is required. However, since a coil component requires characteristics such as inductance and direct current resistor (Rdc) having an appropriate value, there is a limitation in miniaturizing the coil component. Therefore, research is being conducted to reduce the size of a configuration, other than coils such as external electrodes.

SUMMARY

An aspect of the present disclosure is to provide a coil component for minimizing the size of an external electrode.

Another aspect of the present disclosure is to provide a coil component for miniaturizing a product.

Another aspect of the present disclosure is to provide a coil component for maximizing the volume of a body.

Another aspect of the present disclosure is to provide a coil component for minimizing plating spread.

According to an aspect of the present disclosure, a coil component includes: a body having first and second surfaces opposed in a length direction, third and fourth surfaces opposed in a width direction, and fifth and sixth surfaces opposed in a thickness direction; a coil portion disposed inside the body; a first insulating layer covering a portion of each of the fifth surface of the body and the sixth surface of the body; a second insulating layer covering a portion of each of the third surface of the body and the fourth surface of the body; a first external electrode disposed on the first surface of the body; and a second external electrode disposed on the second surface of the body.

According to another aspect of the present disclosure, a coil component includes: a body having first and second surfaces opposed in a length direction, third and fourth surfaces opposed in a width direction, and fifth and sixth surfaces opposed in a thickness direction; a coil portion disposed inside the body; an insulating layer covering portions of each of the third surface of the body, the fourth surface of the body, the fifth surface of the body, and the sixth surface of the body; and a first external electrode disposed on the first surface of the body; and a second external electrode disposed on the second surface of the body. The insulating layer has a step on each of the fifth surface of the body and the sixth surface of the body.

According to another aspect of the present disclosure, a coil component includes: a body having first and second surfaces opposed in a first direction, third and fourth surfaces opposed in a second direction, and fifth and sixth surfaces opposed in a third direction; a coil portion disposed inside the body; a first insulating layer covering a portion of one of the fifth surface of the body and the sixth surface of the body; a second insulating layer covering a portion of one of the third surface of the body and the fourth surface of the body, and having an interface with the first insulating layer; a first external electrode disposed on the first surface of the body; and a second external electrode disposed on the second surface of the body.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, a coil component according to an example of the present disclosure will be described in detail with reference to the drawings.

In the present disclosure, it should be noted in advance that each of expressions of a length, a width, and a thickness has been described as a length in a length (L) direction, a width in a width (W) direction, and a thickness in a thickness (T) direction, respectively.

Figure 1:
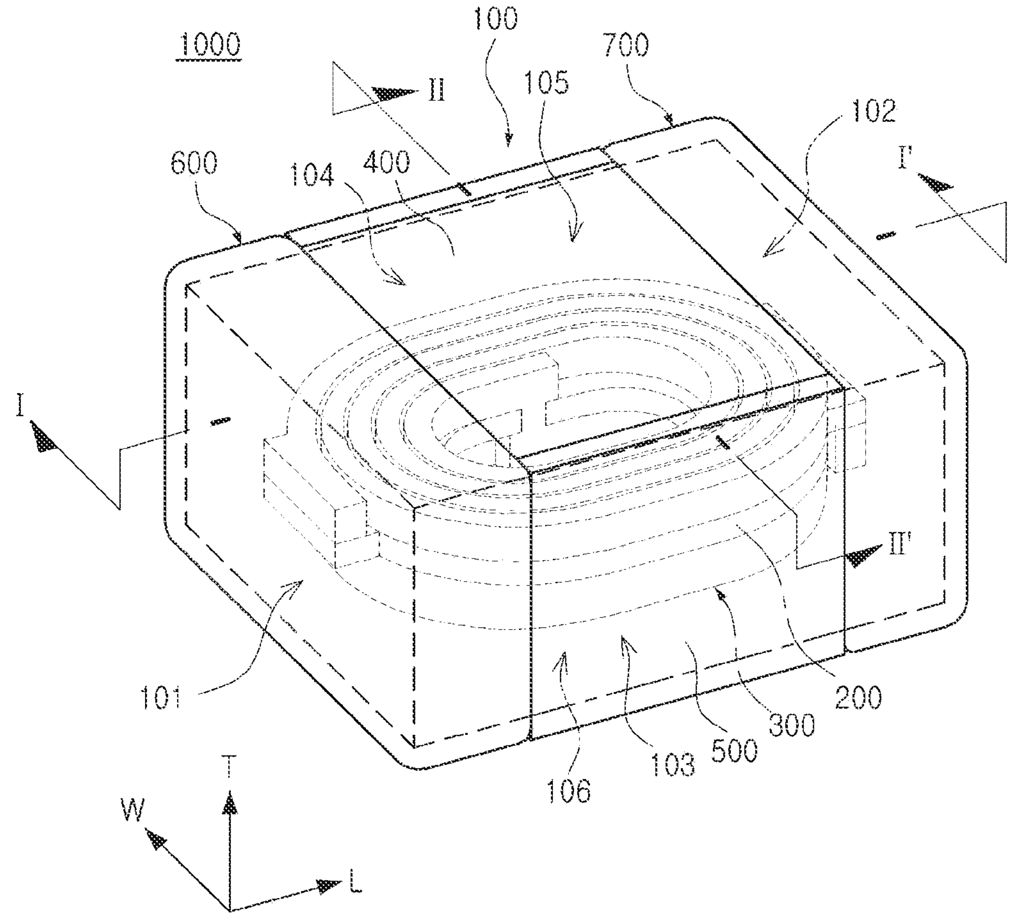
FIG. 1 is a perspective view schematically illustrating a coil component according to an example of the present disclosure.
Figure 2:
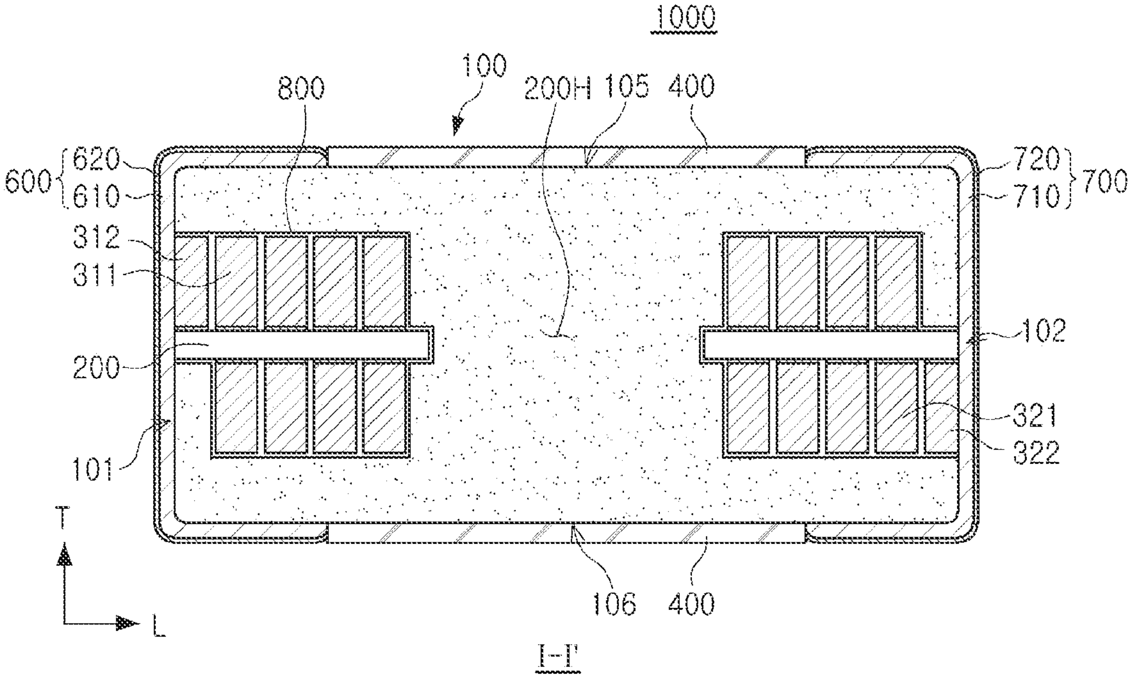
FIG. 2 is a cross-sectional view schematically illustrating a structure of the coil component of FIG. 1 taken along line I-I'.
Figure 3:
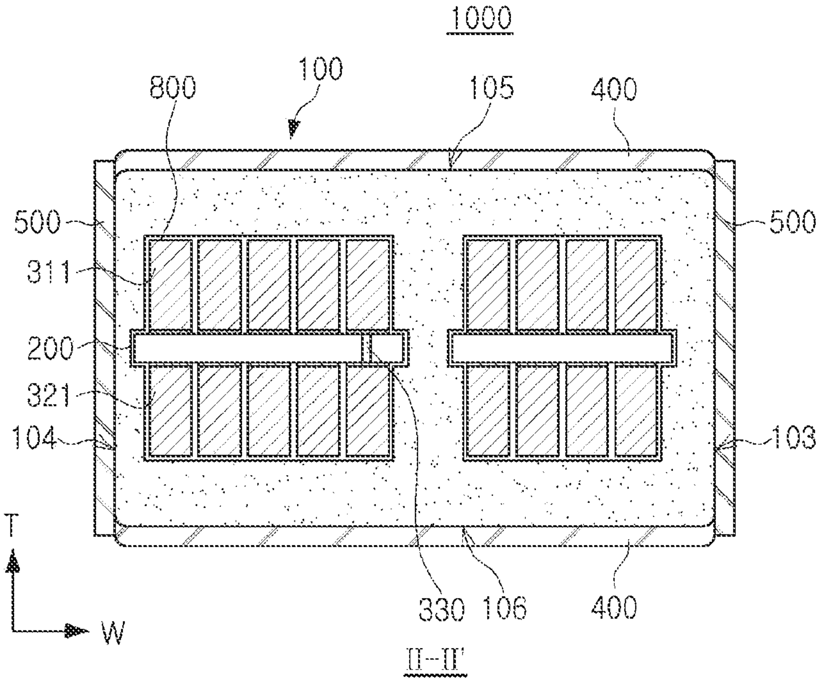
FIG. 3 is a cross-sectional view schematically illustrating a structure of the coil component of FIG. 1 taken along line II-II'.

FIG. 1 is a perspective view schematically illustrating a coil component according to an example of the present disclosure, FIG. 2 is a cross-sectional view schematically illustrating of a structure of the coil component of FIG. 1 taken along line I-I', and FIG. 3 is a cross-sectional view schematically illustrating a structure of the coil component of FIG. 1 taken along line II-II'.

Referring to FIGS. 1 to 3, a coil component 1000 according to an example includes a body 100, a coil portion 300, insulating layers 400 and 500, and external electrodes 600 and 700. The coil component 1000 according to an example may further include a support member 200, and the coil portion 300 may be disposed thereon. In addition, the coil component 1000 according to an example may further include an insulating film 800 disposed on the coil portion 300. However, the configuration of the coil component 1000 according to an example is not limited to the above-described configurations, and other configurations may be further included.

The body 100 forms an overall appearance of the coil component 1000, and may serve to embed the support member 200 and the coil unit 300 disposed inside the body 100.

The body 100 has a first surface 101 and a second surface 102 opposed in a length direction (L), a third surface 103 and a fourth surface 104 opposed in a width (W) direction, and a fifth surface 105 and a sixth surface 106 opposed in a thickness (T) direction. A shape of the body 100 may be a hexahedral shape, but the shape of the body 100 is not limited thereto.

The body 100 may include magnetic powder and an insulating resin. Specifically, the body may be formed by stacking at least one or more magnetic composite sheets including an insulating resin and magnetic powder dispersed in the insulating resin, and then curing the stacked magnetic composite sheets. In this case, the magnetic powder dispersed in the insulating resin may be one type, or two or more types. However, the body 100 may have a structure other than a structure in which magnetic powder is dispersed in an insulating resin. For example, the body 100 may be formed of a magnetic material such as ferrite.

The magnetic powder may be, for example, ferrite powder or metal magnetic powder.

The ferrite powder may be powder including, for example, at least one or more materials among a spinel ferrite such as an Mg—Zn ferrite, an Mn—Zn ferrite, an Mn—Mg ferrite, a Cu—Zn ferrite, an Mg—Mn—Sr ferrite, an Ni—Zn ferrite, and the like, a hexagonal ferrite such as a Ba—Zn ferrite, a Ba—Mg ferrite, a Ba—Ni ferrite, a Ba—Co ferrite, a Ba—Ni—Co ferrite, and the like, a garnet ferrite such as a Y ferrite, and a Li ferrite.

The magnetic metal powder may include one or more elements selected from a group consisting of iron (Fe), silicon (Si), chromium (Cr), cobalt (Co), molybdenum (Mo), aluminum (Al), niobium (Nb), copper (Cu), and nickel (Ni). For example, the magnetic metal powder may be powder including one or more materials among pure iron powder, Fe—Si alloy powder, Fe—Si—Al alloy powder, Fe—Ni alloy powder, Fe—Ni—Mo alloy powder, Fe—Ni—Mo—Cu alloy powder, Fe—Co alloy powder, Fe—Ni—Co alloy powder, Fe—Cr alloy powder, Fe—Cr—Si alloy powder, Fe—Si—Cu—Nb alloy powder, Fe—Ni—Cr alloy powder, and Fe—Cr—Al alloy powder.

The magnetic metal powder may be amorphous or crystalline. For example, the magnetic metal powder may be Fe—Si—B—Cr amorphous alloy powder, but the magnetic metal powder is not limited thereto.

The insulating resin may include at least one of epoxy, polyimide, and liquid crystal polymer, but the type of the insulating resin is not limited to the examples described above.

The support member 200 is disposed inside the body 100, and may serve to support the coil pattern 311 and 321 and the lead-out portions 312 and 322 of the coil portion 300.

The support member 200 may have a through-portion 200H. An inside of the through-portion 200H may be filled with the body 100. In this case, a shape of the support member 200 may be a shape in which regions other than the region corresponding to the coil portion 300 are removed so as to correspond to the shape of the coil portion 300.

The support substrate 200 may be formed of a thermosetting insulating resin such as an epoxy resin, a thermoplastic insulating resin such as a polyimide, or a photosensitive insulating resin, or a material in which a reinforcing material such as a glass fiber or an inorganic filler is impregnated with these resins, or the like. For example, the support substrate 200 may be formed of an insulating material such as prepreg, Ajinomoto Build-up Film (ABF), FR-4, a bismaleimide triazine (BT) resin, a photoimageable dielectric (PID), and the like.

The thickness of the support member 200 may exceed 20 μm and be less than or equal to 30 μm. When the thickness of the support member 200 is less than or equal to 20 μm, it may be difficult to secure the rigidity of the support member 200 and it may be difficult to support the coil portion 300 during the manufacturing process. On the other hand, when the thickness of the support member 200 exceeds 30 μm, it may be disadvantageous in reducing the thickness of the coil component.

The coil portion 300 may be disposed inside the body 100 so that the coil component 1000 may serve as a coil component. For example, when the coil component 1000 of the present embodiment is used as a power inductor, the coil portion 300 may store an electric field as a magnetic field and maintain an output voltage, thereby stabilizing power of an electronic device.

The coil portion 300 may include coil patterns 311 and 321 and lead-out portions 312 and 322, and may further include a via 330. The coil patterns 311 and 321 may include a first coil pattern 311 and a second coil pattern 321, and the lead-out portions 312 and 322 may include a first lead-out portion 312 and a second lead-out portion 322.

In this case, the first coil pattern 311 and the first lead-out portion 312 may be disposed on one surface of the support member 200, and the second coil pattern 321 and the second lead-out portion 322 may be disposed on the other surface, which is opposite to the one surface of the support member 200. Here, one surface and the other surface of the support member 200 may be two surfaces opposed in the thickness (T) direction.

Meanwhile, the first coil pattern 311 and the second coil pattern 321 may be electrically connected to each other through a via 330 penetrating through the support member 200, and each may be physically connected to the via 330. Through this structure, the coil portion 300 may be connected in an order of the first lead-out portion 312, the first coil pattern 311, the via 330, the second coil pattern 321, and the second lead-out portion 322, to function as a single coil.

Each of the first coil pattern 311 and the second coil pattern 321 may have a planar spiral shape including at least one turn. Each of the first coil pattern 311 and the second coil pattern 321 may have a shape corresponding to the shape of the support member 200. Meanwhile, the via 330 may connect a turn disposed at an innermost side of each of the turns of the first coil pattern 311 and the second coil pattern 321.

The first lead-out portion 312 may have a shape extending from the first coil pattern 311, and may be integrated with the first coil pattern 311. The second lead-out portion 322 may have a shape extending from the second coil pattern 321, and may be integrated with the second coil pattern 321. In this case, the first lead-out portion 312 may be connected to a turn disposed at the outermost side of a turn of the first coil pattern 311, and the second lead-out portion 322 may be connected to a turn disposed at the outermost side of a turn of the second coil pattern 321.

Each of the coil patterns 311 and 321 and the lead-out portions 312 and 322 may be formed of a conductive material, such as copper (Cu), aluminum (Al), silver (Ag), tin (Sn), gold (Au), nickel (Ni), lead (Pb), titanium (Ti), or an alloy thereof may be formed, but is not limited thereto.

Each of the coil patterns 311 and 321 and the lead-out portions 312 and 322 may be formed through a known plating process. For example, each of the coil patterns 311 and 321 and the lead-out portions 312 and 322 may be formed by forming a seed layer on the support member 200 and forming an electrolytic plating layer on the seed layer. The electrolytic plating layer may be a single layer or a multilayer.

The first coil pattern 311 and the first lead-out portion 312 may be formed simultaneously by plating on one surface of the support member 200, and thus the first coil pattern 311 and the first lead-out portion 312 may be integrated with each other. Similarly, the second coil pattern 321 and the second lead-out portion 322 can be formed simultaneously by plating on the other surface of the support member 200, and thus the second coil pattern 321 and the second lead-out portion 322 may be integrated with each other.

The via 330 may also be formed of a conductive material, such as copper (Cu), aluminum (Al), silver (Ag), tin (Sn), gold (Au), nickel (Ni), lead (Pb), titanium (Ti), or an alloy thereof, but is not limited thereto.

The via 330 may also be formed through a known plating process. For example, the via 330 may be formed by forming a via hole in the support member 200, forming a seed layer on a wall surface of the via hole, and then forming an electroplating layer on the seed layer to fill an inside of the via hole.

The via 330 may be integrally formed with the first coil pattern 311 or the second coil pattern 321, and may not have a boundary with the first coil pattern 311 or the second coil pattern 321. For example, the via 330 and the first coil pattern 311 may simultaneously be formed by forming a via hole in the support member 200, forming a seed layer on a wall surface of the via hole and one surface of the support member 200, and filling the inside of the via hole and forming an electroplating layer to extend onto one surface of the support member 200.

Alternatively, the via 330 and the second coil pattern 321 may be formed simultaneously by forming a via hole in the support member 200, forming a seed layer on a wall surface of the via hole and the other surface of the support member 200, and filling an inside of the via hole and forming an electroplating layer to extend onto the other surface of the support member 200.

Alternatively, the via 330 may be formed separately from each of the first coil pattern 311 and the second coil pattern 321, and the via 330 may include a low-melting point metal layer such as a solder containing lead (Pb) and/or tin (Sn). At least a portion of the low-melting point metal layer may be melted due to pressure and temperature during collective stacking, and therefore, an intermetallic compound (IMC) layer can be formed.

The first insulating layer 400 covers at least a portion of each of the fifth surface 105 of the body 100 and the sixth surface 106 of the body 100. In this case, the first insulating layer 400 may be spaced apart from an edge between each of the fifth surface 105 of the body 100 and the sixth surface 106 of the body 100, and each of the first surface 101 of the body 100 and the second surface 102 of the body 100. External electrodes 600 and 700 may be formed in a region, not covered by the first insulating layer 400 among the fifth surface 105 of the body 100 and the sixth surface 106 of the body 100. As described later, the external electrodes 600 and 700 may be formed by a known plating process, or the like, and the first insulating layer 400 may function as a plating prevention layer. However, depending on the design, the first insulating layer 400 may also cover all of the fifth surface 105 of the body 100 and/or the sixth surface 106 of the body 100.

The first insulating layer 400 may be formed at a bar level, which is a step prior to a dicing process performed to separate into individual units. Specifically, the first insulating layer 400 may be formed by performing screen printing, inkjet printing, or the like, in a region in which the external electrodes 600 and 700 of each of the fifth surface 105 of the body 100 and the sixth surface 106 of the body 100 will be formed at the bar level.

The second insulating layer 500 covers at least a portion of each of the third surface 103 of the body 100 and the fourth surface 104 of the body 100. In this case, the second insulating layer 500 may be spaced apart from an edge between each of the third surface 103 of the body 100 and the fourth surface 104 of the body 100, and each of the first surface 101 of the body 100 and the second surface 102 of the body 100. External electrodes 600 and 700 may be formed in a region, not covered by the second insulating layer 500 among the third surface 103 of the body 100 and the fourth surface 104 of the body 100. As described later, the external electrodes 600 and 700 may be formed by a known plating process, or the like, and the second insulating layer 500 may function as a plating prevention layer. However, depending on the design, the second insulating layer 500 may also cover all of the third surface 103 of the body 100 and the fourth surface 104 of the body 100.

The second insulating layer 500 may be formed in a state in which a plurality of bodies 100 are separated from each other after the dicing process. Specifically, the second insulating layer 500 may be formed in a region excluding regions in which external electrodes 600 and 700 of each of the third surface 103 of the body 100 and the fourth surface 104 of the body are to be formed through a pad printing process, or the like.

In this case, prior to forming the second insulating layer 500, a passivation layer may be formed in a region in which the external electrodes 600 and 700 of the first to sixth surfaces 101, 102, 103, 104, 105, and 106 of the body 100 are to be formed, such that the second insulating layer 500 may not be formed in a region in which the external electrodes 600 and 700 will be formed. The passivation layer may be formed by dipping the body 100 into a material for forming the second insulating layer 500.

Meanwhile, the passivation layer may be formed to cover a region in which the external electrodes 600 and 700 are to be formed among the fifth surface 105 of the body 100 and the sixth surface 106 of the body 100, and to further cover a portion of the first insulating layer 400. Therefore, depending on a region in which the passivation layer is formed, a length of the first insulating layer 400 and a length of the second insulating layer 500 may be different from each other.

Each of the first insulating layer 400 and the second insulating layer 500 may be formed of a thermosetting resin such as an epoxy resin, a thermoplastic resin such as polyimide, a photosensitive resin, or a reinforcing material in which a reinforcing material such as glass fiber and/or an inorganic filler impregnated with these resins, or the like. For example, each of the first insulating layer 400 and the second insulating layer 500 may be formed of a material impregnated with an inorganic filler in an epoxy resin. The first insulating layer 400 and the second insulating layer 400 may be formed of the same material or different materials.

The length of the first insulating layer 400 and the length of the second insulating layer 500 may be the same or may be different from each other. In addition, the thickness of the first insulating layer 400 and the width of the second insulating layer 500 may be the same or different from each other. For example, the thickness of the second insulating layer 500 may be greater than the width of the first insulating layer 400. Here, the thickness of the first insulating layer 400 refers to a thickness in a thickness (T) direction, and the width of the second insulating layer 500 refers to a width in a width (W) direction.

As described above, the first insulating layer 400 and the second insulating layer 500 may be formed through a separate process. Therefore, the first insulating layer 400 and the second insulating layer 500 have a boundary or an interface therebetween. In this case, as shown in the drawing, the second insulating layer 500 formed after the first insulating layer 400 is formed may cover at least a portion of side surfaces of the first insulating layer 400 opposed in the width (W) direction.

The external electrodes 600 and 700 are disposed on a surface of the body 100 and are connected to the lead-out portions 312 and 322 of the coil portion 300. The external electrodes 600 and 700 are disposed on at least the first surface 101 of the body 100 and the second surface 102 of the body 100, respectively. In addition, the external electrodes 600 and 700 may extend onto at least one of the third to sixth surfaces 103, 104, 105, and 106 of the body 100. For example, as shown in the drawing, the external electrode 600 may cover the first surface 101 of the body, and may further cover portions of each of the third to sixth surfaces 103, 104, 105, and 106 of the body 100, and the external electrode 700 may cover the second surface 102 of the body, and may further cover portions of each of the third to sixth surfaces 103, 104, 105, and 106 of the body 100.

However, a structure of the external electrodes 600 and 700 is not limited to the structure shown in the drawing, and may be changed according to design. For example, the external electrode 600 may have a 'C' shape covering a portion of the first surface 101 of the body 100, further covering a portion of each of the fifth surface 105 of the body 100 and the sixth surface 106 of the body 100, and not covering the third surface 103 of the body 100 and the fourth surface 104 of the body 100, and the external electrode 700 may have a 'C' shape covering a portion of the second surface 102 of the body 100, further covering a portion of each of the fifth surface 105 of the body 100 and the sixth surface 106 of the body 100, and not covering the third surface 103 of the body 100 and the fourth surface 104 of the body 100. Alternatively, the external electrode 600 may have an 'L' shape covering the first surface 101 of the body 100, further covering a portion of the sixth surface 106 of the body 100, and not covering the third to fifth surfaces 103, 104, and 105 of the body 100, and the external electrode 700 may have an 'L' shape covering the second surface 102 of the body 100, further covering a portion of the sixth surface 106 of the body 100, and not covering the third to fifth surfaces 103, 104, and 105 of the body 100.

The external electrodes 600 and 700 may be formed of a conductive material such as copper (Cu), aluminum (Al), silver (Ag), tin (Sn), gold (Au), nickel (Ni), lead (Pb), titanium (Ti), or an alloy thereof.

The external electrodes 600 and 700 may include a first external electrode 600 disposed on the first surface 101 of the body 100 and a second external electrode 700 disposed on the second surface 102 of the body 100. The first external electrode 600 may be connected to a first lead-out portion 312 exposed to the first surface 101 of the body 100, and the second external electrode 700 may be connected to a second lead-out portion 322 exposed to the second surface 102 of the body 100.

The external electrodes 600 and 700 may include a plurality of layers. For example, the first external electrode 600 may include a first layer 610 and a second layer 620 disposed on the first layer 610, and the second external electrode 700 may include a first layer 710 and a second layer 720 disposed on the first layer 710. Here, each of the first layers 610 and 710 and the second layers 620 and 720 may be a single layer, or may include a plurality of layers.

The external electrodes 600 and 700 may be formed through a plating process. For example, the external electrodes 600 and 700 may be formed by forming the first layers 610 and 710 on the surface of the body 100 through electroless or electrolytic plating, and forming the second layers 620 and 720 on the first layers 610 and 710 through electroless or electrolytic plating. Specifically, the external electrodes 600 and 700 may be formed by barrel plating. However, a method of forming the external electrodes 600 and 700 is not limited to the plating process, and the external electrodes 600 and 700 may be formed by immersion or printing using a conductive paste.

Therefore, each of the first layers 610 and 710 and the second layers 620 and 720 may be first metal layers and second metal layers. However, each of the first layers 610 and 710 and the second layers 620 and 720 may be first resin layers and second resin layers including metal.

Each of the first layers 610 and 710 and the second layers 620 and 720 may be formed of the same material as each other, and may be formed of different materials from each other. For example, the first layers 610 and 710 may be copper electrolytic plating layers, and the second layers 620 and 720 may be stacked layers of a nickel electroplating layer and a tin electroplating layer.

A formation height to which each of the first layers 610 and 710 and the second layers 620 and 720 are formed may be the same or different from each other. Here, a height means a height measured in a direction perpendicular to each of the first to sixth surfaces 101, 102, 103, 104, 105 and 106 of the body 100. Specifically a length on each of the first surface 101 of the body 100 and the second surface 102 of the body 100 of each of the first layers 610 and 710 and the second layers 620 and 720 may be the same or different from each other. A width on each of the third surface 103 of the body 100 and the fourth surface 104 of the body 100 of each of the first layers 610 and 710 and the second layers 620 and 720 may be same or different from each other. A thickness on each of the fifth surface 105 of the body 100 and the sixth surface 106 of the body 100 of each of the first layers 610 and 710 and the second layers 620 and 720 may be the same or different from each other. In addition, when the second layers 620 and 720 include a plurality of layers, a formation height of each of the layers included in the second layers 620 and 720 may be the same or different from each other.

For example, the first layers 610 and 710 may be copper plating layers formed to a height of 13 μm, and the second layers 620 and 720 may be layers consisting of a nickel plating layer formed to a height of 3 μm and a tin plating layer formed to a height of 3 μm. Therefore, a formation height of the external electrodes 600 and 700 may be 19 μm. In one example, the height of each of the first layers 610 and 710 may be greater than the height of the nickel plating layer and the height of the tin plating layer.

The widths of the external electrodes 600 and 700 on each of the third surface 103 of the body 100 and the fourth surface 104 of the body 100 may be wider or narrower than the width of the second insulating layer 500. Alternatively, the width of the external electrodes 600 and 700 on each of the third surface 103 of the body 100 and the fourth surface 104 of the body 100 may be the same as the width of the second insulating layer 500. A difference between the widths of the external electrodes 600 and 700 and the width of the second insulating layer 500 on each of the third surface 103 of the body 100 and the fourth surface 104 of the body 100 may be 10 μm or less.

The thickness of the external electrodes 600 and 700 on each of the fifth surface 105 of the body 100 and the sixth surface 106 of the body 100 may be thicker or thinner than the thickness of the first insulating layer 400. Alternatively, the thickness of the external electrodes 600 and 700 on each of the fifth surface 105 of the body 100 and the sixth surface 106 of the body 100 may be the same as the thickness of the first insulating layer 400. A difference the thickness of the external electrodes 600 and 700 and the thickness of the second insulating layer 500 on each of the fifth surface 105 of the body 100 and the sixth surface 106 of the body 100 may be 10 μm or less.

Meanwhile, in the coil component 1000 according to an example, after forming the first insulating layer 400 and the second insulating layer 500 on a surface of the body 100, external electrodes 600 and 700 are formed. In this case, since a plating layer is not formed on the surface on which the first insulating layer 400 and the second insulating layer 500 are formed, external electrodes 600 and 700 may be formed only on the surface on which the first insulating layer 400 and the second insulating layer 500 of the body 100 are not formed, through a plating process selectively. When the external electrodes 600 and 700 are formed through the plating process as described above, the external electrodes may be formed at a low height, and thus the size of the external electrodes may be minimized. Thereby, a coil component for miniaturizing a product may be provided, and in the case of a coil component having the same size, a coil component for maximizing a volume of a body may be provided.

An insulating film 800 may serve to insulate the coil portion 300 from the body 100. The insulating film 800 may be formed on the coil portion 300, and may also be formed on the support member 200. The insulating film 800 may be formed of an insulating material, for example, may be formed of parylene. The insulating film 800 may be formed by vapor deposition or the like, and may be formed in a form of a conformal film along the surfaces of the support member 200 and the coil portion 300, and may also be formed to fill an interval between turns of each of the coil patterns 311 and 321 of the coil portion 300 and an interval between the coil patterns 311 and 321 and the lead-out portions 312 and 322. However, the present disclosure is not limited thereto, and the insulating film 800 may also be formed by stacking an insulation film on both surface of the support member 200.

Meanwhile, in the coil component 1000, the insulating film 800 is a selective configuration, and when the insulating film 800 is not required, such as that the body 100 can secure sufficient insulation resistance under operating conditions of the coil component 1000 according to the present embodiment, the insulating film 800 may be omitted.

Figure 4:
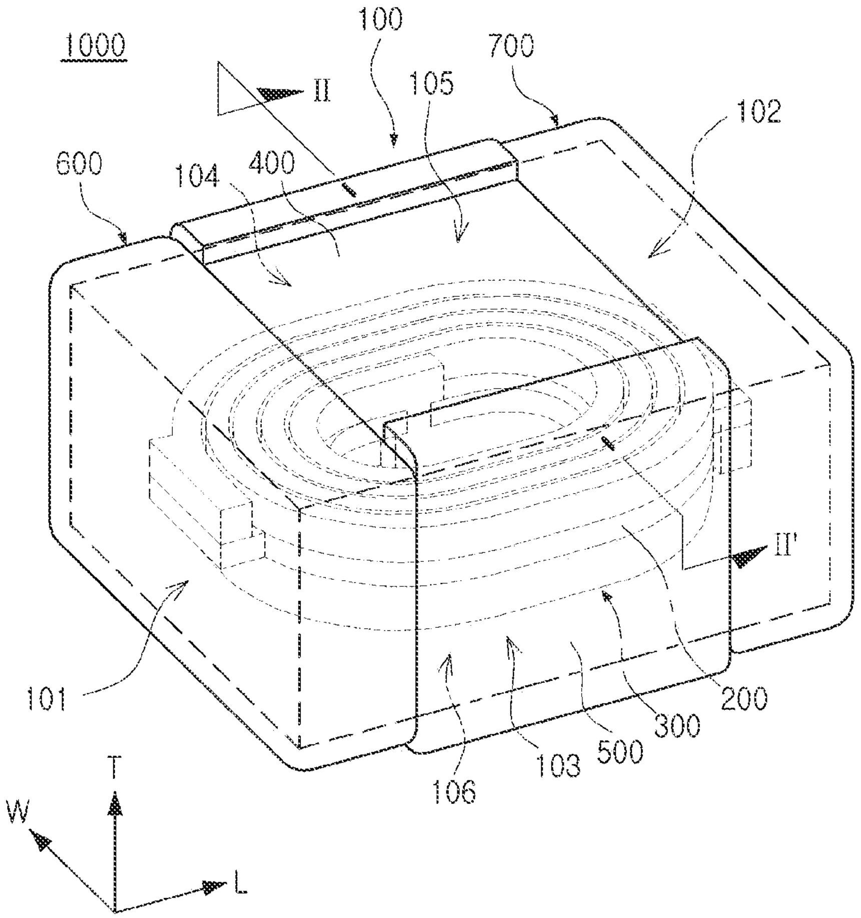
FIG. 4 is a perspective view schematically illustrating a coil component according to another example of the present disclosure.
Figure 5:
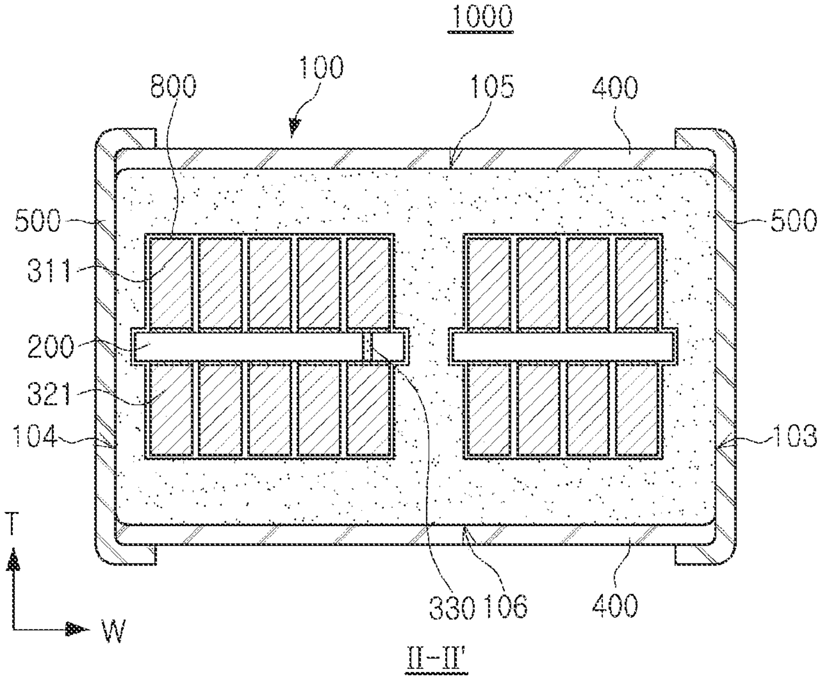
FIG. 5 is a cross-sectional view schematically illustrating a structure of the coil component of FIG. 4 taken along line II-II'.

FIG. 4 is a perspective view schematically showing a coil component according to another example of the present disclosure. FIG. 5 is a cross-sectional view schematically showing a structure of the coil component of FIG. 4 taken along line II-II'.

Referring to FIG. 4, in a coil component 1000 according to another example, a second insulating layer 500 extends onto at least one of the fifth surface 105 of the body and the sixth surface 106 of the body 100 to cover at least a portion of a first insulating layer 400. Therefore, a second insulating layer 500 is disposed on the first insulating layer 400 in a region, adjacent to the fifth surface 105 of the body 100 and the sixth surface 106 of the body 100 and the third surface 103 of the body 100 and the fourth surface 104 of the body 100.

Therefore, an insulating layer has a step on each of the fifth surface 105 of the body 100 and the sixth surface 106 of the body 100. Specifically, the thickness of the insulating layer is thicker in a region, adjacent to the third surface 103 of the body 100 and the fourth surface 104 of the body 100 of each of the fifth surface 105 of the body 100 and the sixth surface 106 of the body 100 than an insulating layer at the center of the insulating layer along the width W direction.

The insulating layer in a region, adjacent to the third surface 103 of the body 100 and the fourth surface 104 of the body 100 of each of the fifth surface 105 of the body 100 and the sixth surface 106 of the body 100 include a first insulating layer 400 and a fifth insulating layer 500, and the insulating layer at the center of the insulating layer along the width W direction includes only the first insulating layer 400.

Meanwhile, since a plurality of insulating layers including the first insulating layer 400 and the second insulating layer 500 are disposed on the body 100 in a region, adjacent to the third surface 103 of the body 100 and the fourth surface 104 of the body 100 of the fifth surface 105 of the body 100 and the sixth surface 106 of the body 100, penetration of a plating solution may be prevented into edge regions between the third surface 103 of the body 100 and the fourth surface 104 of the body and the fifth surface 105 of the body 100 and the sixth surface 106 of the body 100 when the external electrodes 600 and 700 are plated. Therefore, plating spreading can be minimized.

Other descriptions may be applied in the same manner as the description of the coil component according to the example of FIGS. 1 to 3, and detailed descriptions will be omitted.

Figure 6:
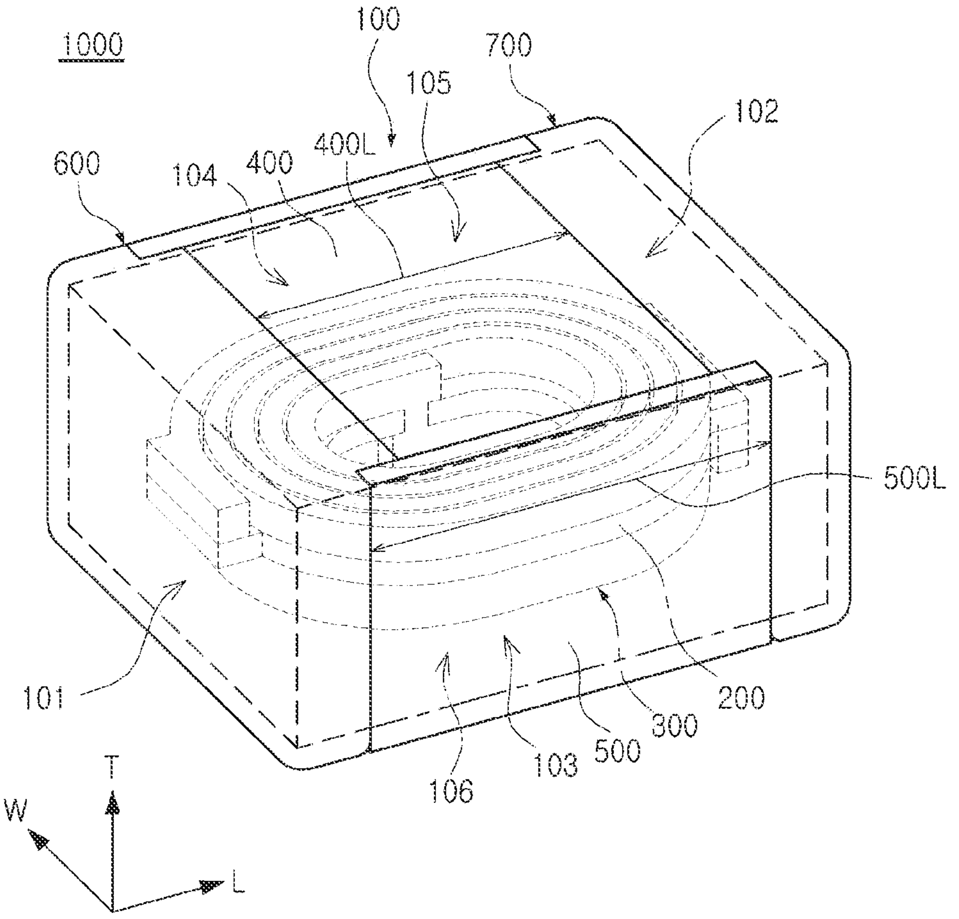
FIG. 6 is a perspective view schematically illustrating a coil component according to another example of the present disclosure.

FIG. 6 is a perspective view schematically showing a coil component according to another example of the present disclosure.

Referring to FIG. 6, a coil component 1000 according to another example has a length 400L of a first insulating layer 400 and a length 500L of the second insulating layer 500 different from each other. For example, the length 400L of the first insulating layer 400 may be less than the length 500L of the second insulating layer 500.

As described above, since the first insulating layer 400 and the second insulating layer 500 are formed through different processes, the length 400L of the first insulating layer 400 and the length 500L of the second insulating layer 500 may be formed differently from each other.

In the drawing, the length 400L of the first insulating layer 400 and the length 500L of the second insulating layer 500 are shown to be the same in all regions, but the length 400L of the first insulating layer 400 and/or the length 500L of the second insulating layer 500 may be different for each region.

Meanwhile, the length 400L of the first insulating layer 400 on each of the fifth surface 105 of the body 100 and the sixth surface 106 of the body 100 may be the same or different from each other. The length 500L of the second insulating layer 500 on each of the third surface 103 of the body 100 and the fourth surface 104 of the body 100 may be the same or different from each other.

Other descriptions may be applied in the same manner as the description of the coil component according to the example of FIGS. 1 to 3, and detailed descriptions will be omitted.

Figure 7:
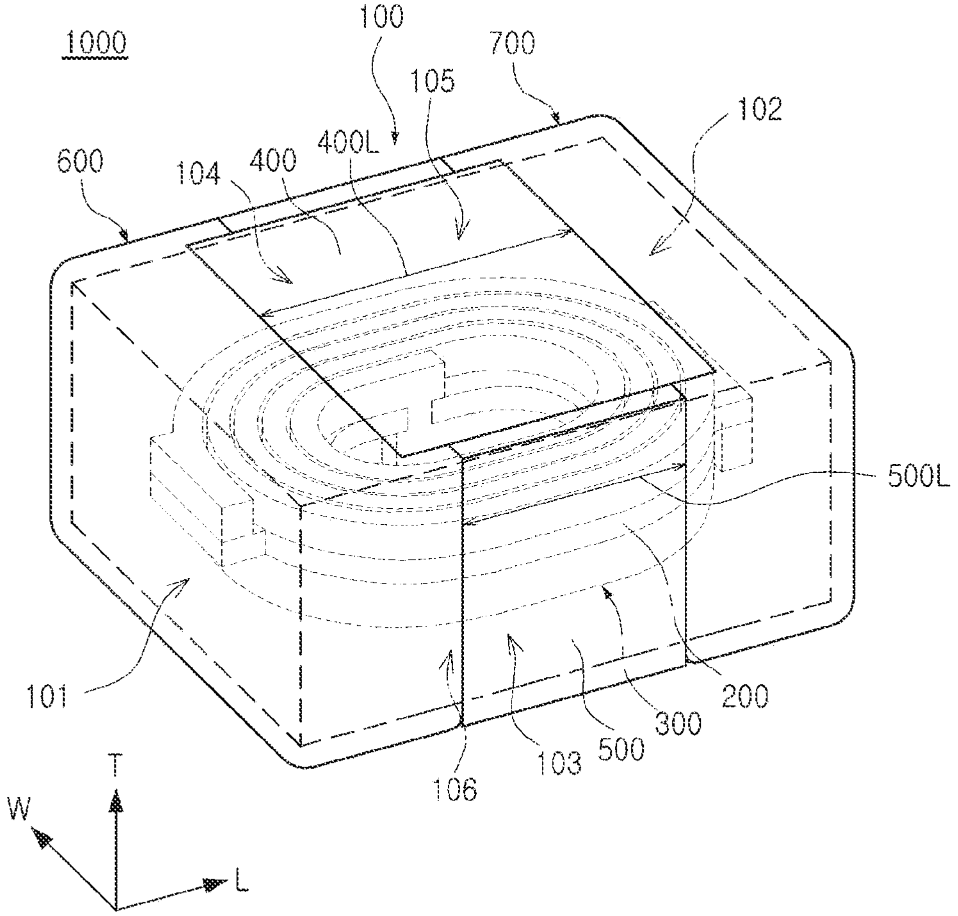
FIG. 7 is a perspective view schematically illustrating a coil component according to another example of the present disclosure.

FIG. 7 is a perspective view schematically showing a coil component according to another example of the present disclosure.

Referring to FIG. 7, a coil component 1000 according to another example has a length 400L of a first insulating layer 400 and a length 500L of the second insulating layer 500 different from each other. For example, the length 400L of the first insulating layer 400 may be greater than the length 500L of the second insulating layer 500.

As described above, since the first insulating layer 400 and the second insulating layer 500 are formed through different processes, the length 400L of the first insulating layer 400 and the length 500L of the second insulating layer 500 may be formed differently from each other.

In the drawing, the length 400L of the first insulating layer 400 and the length 500L of the second insulating layer 500 are shown to be the same in all regions, but the length 400L of the first insulating layer 400 and/or the length 500L of the second insulating layer 500 may be different for each region.

Meanwhile, the length 400L of the first insulating layer 400 on each of the fifth surface 105 of the body 100 and the sixth surface 106 of the body 100 may be the same or different from each other. The length 500L of the second insulating layer 500 on each of the third surface 103 of the body 100 and the fourth surface 104 of the body 100 may also be the same or different from each other.

Other descriptions may be applied in the same manner as the description of the coil component according to the example of FIGS. 1 to 3, and detailed descriptions will be omitted.

Figure 8:
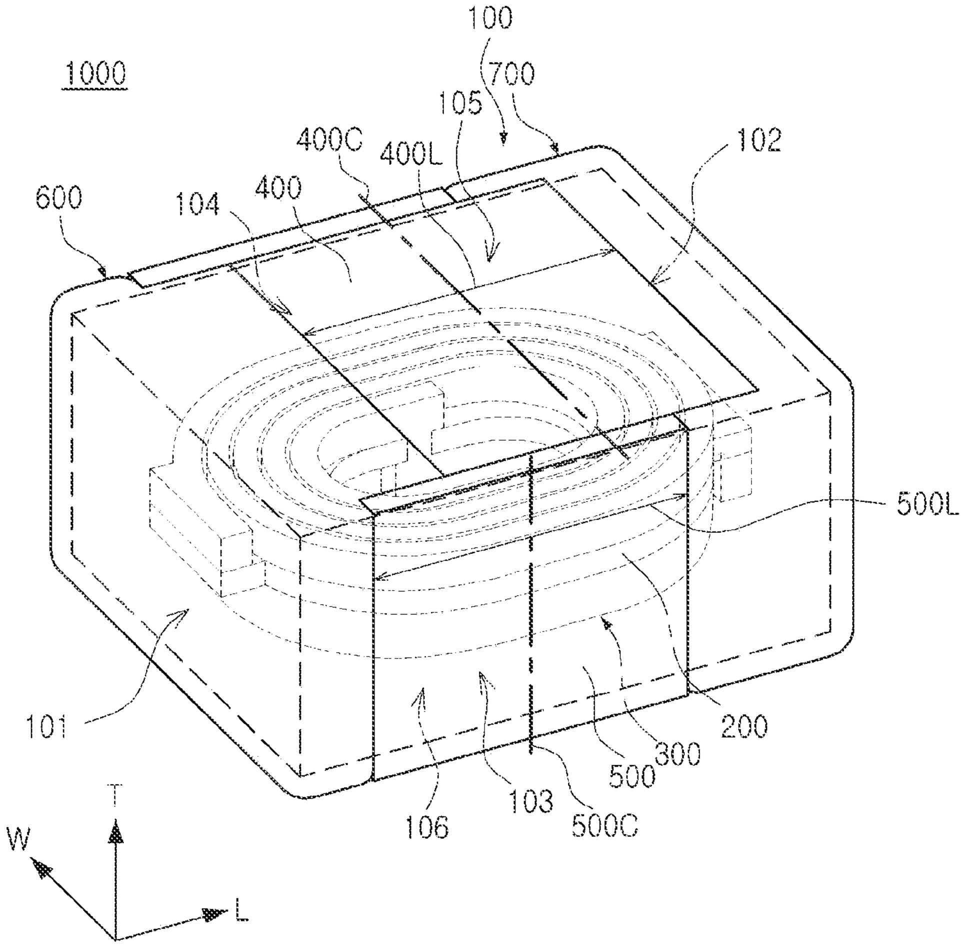
FIG. 8 is a perspective view schematically illustrating a coil component according to another example of the present disclosure.

FIG. 8 is a perspective view schematically illustrating a coil component according to another example of the present disclosure.

Referring to the drawing, in a coil component 1000 according to another example, a center 400C of the first insulating layer 400 along the length (L) direction and a center 500C of the second insulating layer 500 along the length (L) direction are disposed to be offset from each other.

As described above, since the first insulating layer 400 and the second insulating layer 500 are formed through different processes, the center 400C of the first insulating layer 400 along the length (L) direction and the center 500C of the second insulating layer 500 along the length (L) direction may be disposed to be offset from each other.

In the drawing, a length 400L of the first insulating layer 400 and a length 500L of the second insulating layer 500 are shown to be the same in all regions, but the length 400L of the first insulating layer 400 and/or the length 500L of the second insulating layer 500 may be different for each region.

Meanwhile, the length 400L of the first insulating layer 400 on each of the fifth surface 105 of the body 100 and the sixth surface 106 of the body 100 may be the same or different from each other. The length 500L of the second insulating layer 500 on each of the third surface 103 of the body 100 and the fourth surface 104 of the body 100 may also be the same or different from each other.

Other descriptions may be applied in the same manner as the description of the coil component according to the example of FIGS. 1 to 3, and detailed descriptions will be omitted.

Figure 9:
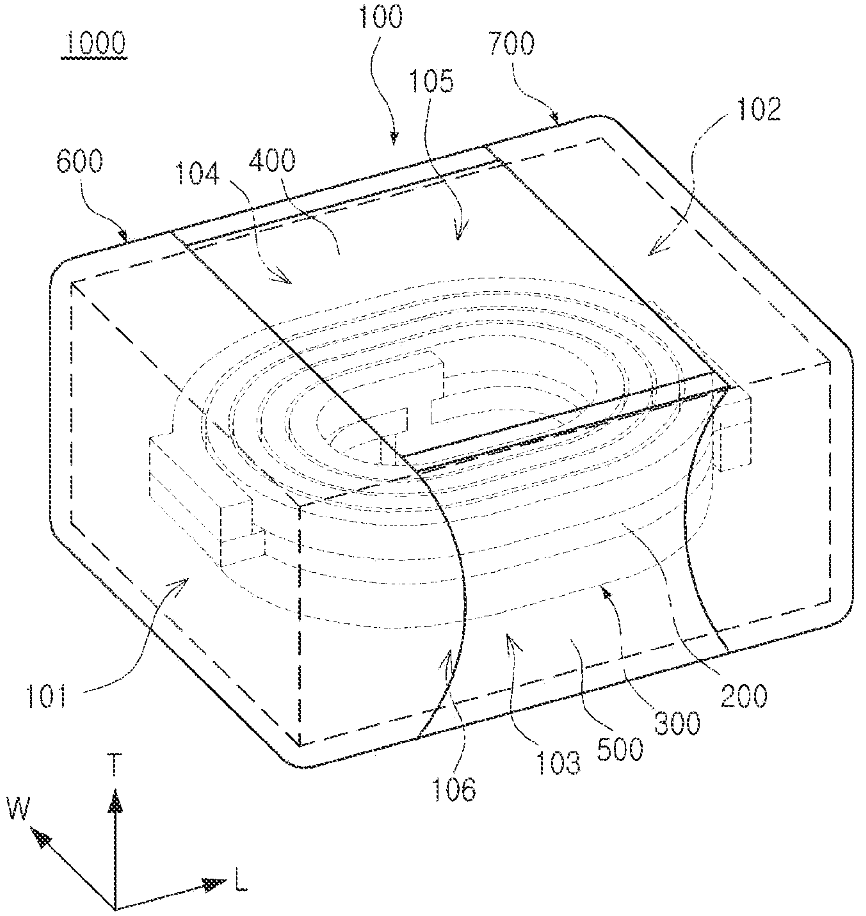
FIG. 9 is a perspective view schematically illustrating a coil component according to another example of the present disclosure.

FIG. 9 is a perspective view schematically showing a coil component according to another example of the present disclosure.

Referring to FIG. 9, a coil component 1000 according to an example includes a region in which a second insulating layer 500 has a curved surface. Such a structure can be derived when the second insulating layer 500 is formed by applying a pad printing method. Meanwhile, a first insulating layer 400 may also include a region having a curved surface according to a method applied to form the first insulating layer 400.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items. It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

As set forth above, according to the present disclosure, a coil component for minimizing the size of an external electrode may be provided.

According to the present disclosure, a coil component for miniaturizing a product may be provided.

According to the present disclosure, a coil component for maximizing the volume of a body may be provided.

According to the present disclosure, a coil component for minimizing plating spread may be provided.

While the exemplary embodiments have been shown and described above, it will be apparent to those skilled in the art that modifications and variations could be made without departing from the scope of the present invention as defined by the appended claims.

What is claimed is:

1. A coil component, comprising:

a body having first and second surfaces opposed in a length direction, third and fourth surfaces opposed in a width direction, and fifth and sixth surfaces opposed in a thickness direction;

a coil portion disposed inside the body;

a first insulating layer covering a portion of each of the fifth surface of the body and the sixth surface of the body;

a second insulating layer covering a portion of each of the third surface of the body and the fourth surface of the body;

a first external electrode disposed on the first surface of the body and extending onto the fifth surface of the body and the sixth surface of the body; and a second external electrode disposed on the second surface of the body and extending onto the fifth surface of the body and the sixth surface of the body, wherein a center of the first insulating layer along the length direction and a center of the second insulating layer along the length direction are disposed to be offset from each other.

2. The coil component of claim 1, wherein the first insulating layer and the second insulating layer have a boundary therebetween.

3. The coil component of claim 1, wherein the second insulating layer covers at least a portion of side surfaces of the first insulating layer opposed in the width direction.

4. The coil component of claim 1, wherein the second insulating layer extends onto at least one of the fifth surface of the body and the sixth surface of the body to cover at least a portion of the first insulating layer.

5. The coil component of claim 1, wherein the first insulating layer is spaced apart from an edge between each of the fifth surface of the body and the sixth surface of the body and each of the first surface of the body and the second surface of the body.

6. The coil component of claim 1, wherein the second insulating layer is spaced apart from an edge between each of the third surface of the body and the fourth surface of the body and each of the first surface of the body and the second surface of the body.

7. The coil component of claim 1, wherein a length of the first insulating layer is different from a length of the second insulating layer.

8. The coil component of claim 1, wherein the first external electrode also extends onto at least one of the third surface of the body and the fourth surface of the body, and wherein the second external electrode also extends onto at least one of the third surface of the body and the fourth surface of the body.

9. The coil component of claim 1, wherein each of the first external electrode and the second external electrode comprises a first metal layer, in contact with the body.

10. The coil component of claim 9, wherein each of the first external electrode and the second external electrode further comprises a second metal layer disposed on the first metal layer.

11. The coil component of claim 1, further comprising a support member disposed inside the body, and having a through-portion, wherein the coil portion comprises a first coil pattern disposed on one surface of the support member, a first lead-out portion disposed on one surface of the support member and connected to the first coil pattern, a second coil pattern disposed on the other surface of the support member, and a second lead-out portion disposed on the other surface of the support member and connected to the second coil pattern, and wherein the first lead-out portion and the second lead-out portion are respectively exposed to the first surface and the second surface of the body, and are respectively connected to the first external electrode and the second external electrode.

12. The coil component of claim 1, wherein one of the first insulating layer and the second insulating layer has a curved surface.

13. A coil component, comprising:

a body having first and second surfaces opposed in a length direction, third and fourth surfaces opposed in a width direction, and fifth and sixth surfaces opposed a thickness direction;

a coil portion disposed inside the body;

an insulating layer covering a portion of each of the third surface of the body, the fourth surface of the body, the fifth surface of the body, and the sixth surface of the body;

a first external electrode disposed on the first surface of the body; and a second external electrode disposed on the second surface of the body, wherein the insulating layer has a step on each of the fifth surface of the body and the sixth surface of the body, wherein the step extends in a direction from the first external electrode to the second external electrode, wherein a thickness of the insulating layer in a region, adjacent to each of the fifth surface of the body and the sixth surface of the body and each of the third surface of the body and the fourth surface of the body, is thicker than a thickness of the insulating layer at a center of the insulating layer along the width direction, and wherein the insulating layer in a region, adjacent to each of the fifth surface of the body and the sixth surface of the body and each of the third surface of the body and the fourth surface of the body, comprises a first insulating layer and a second insulating layer disposed on the first insulating layer.

14. A coil component, comprising:

a body having first and second surfaces opposed in a first direction, third and fourth surfaces opposed in a second direction, and fifth and sixth surfaces opposed in a third direction;

a coil portion disposed inside the body;

a first insulating layer covering a portion of one of the fifth surface of the body and the sixth surface of the body;

a second insulating layer covering a portion of one of the third surface of the body and the fourth surface of the body, and having an interface with the first insulating layer;

a first external electrode disposed on the first surface of the body and extending onto the fifth surface of the body and the sixth surface of the body;

a second external electrode disposed on the second surface of the body and extending onto the fifth surface of the body and the sixth surface of the body;

a third insulating layer covering a portion of another of the fifth surface of the body and the sixth surface of the body; and a fourth insulating layer covering a portion of another of the third surface of the body and the fourth surface of the body, wherein the second insulating layer and the third insulating layer have an interface, wherein the third insulating layer and the fourth insulating layer have an interface, and wherein the first insulating layer and the fourth insulating layer have an interface.

15. The coil component of claim 14, wherein the second insulating layer extends onto a portion of the first insulating layer to cover the portion of the first insulating layer.

16. The coil component of claim 14, wherein a length of the first insulating layer in the first direction is different from a length of the second insulating layer in the first direction.

17. The coil component of claim 14, wherein each of the first external electrode and the second external electrode comprises a metal layer in contact with the body.

18. The coil component of claim 17, wherein each of the first external electrode and the second external electrode further comprises a second metal layer disposed on the first metal layer.

19. The coil component of claim 17, further comprising a support member disposed inside the body, and having a through-portion, wherein the coil portion comprises a first coil pattern disposed on one surface of the support member, a first lead-out portion disposed on one surface of the support member and connected to the first coil pattern, a second coil pattern disposed on the other surface of the support member, and a second lead-out portion disposed on the other surface of the support member and connected to the second coil pattern, wherein the first lead-out portion and the second lead-out portion are respectively exposed to the first surface and the second surface of the body, and are respectively connected to the first external electrode and the second external electrode, and wherein each of the first lead-out portion, the second lead-out portion, and the metal layer is composed of a same material.

20. The coil component of claim 14, further comprising a support member disposed inside the body, and having a through-portion, wherein the coil portion comprises a first coil pattern disposed on one surface of the support member, a first lead-out portion disposed on one surface of the support member and connected to the first coil pattern, a second coil pattern disposed on the other surface of the support member, and a second lead-out portion disposed on the other surface of the support member and connected to the second coil pattern, and wherein the first lead-out portion and the second lead-out portion are respectively exposed to the first surface and the second surface of the body, and are respectively connected to the first external electrode and the second external electrode.

21. The coil component of claim 14, wherein the first insulating layer and the second insulating layer are composed of a resin and a reinforcing material dispersed in the resin.

* * * * *